US009726469B2

(12) United States Patent
Adkins et al.

(10) Patent No.: US 9,726,469 B2
(45) Date of Patent: Aug. 8, 2017

(54) TURNLOCK SMALL CIRCLE COMPASS ATTACHMENT

(71) Applicants: Edward D. Adkins, Truth or Consequences, NM (US); David Aaron Larson, St. Charles, IL (US)

(72) Inventors: Edward D. Adkins, Truth or Consequences, NM (US); David Aaron Larson, St. Charles, IL (US)

(73) Assignee: Nomis LLC, Elgin, IL (US)

( * ) Notice: Subject to any disclaimer, the term of this patent is extended or adjusted under 35 U.S.C. 154(b) by 1015 days.

(21) Appl. No.: 14/013,613

(22) Filed: Aug. 29, 2013

(65) Prior Publication Data

US 2014/0060702 A1 Mar. 6, 2014

Related U.S. Application Data

(60) Provisional application No. 61/695,486, filed on Aug. 31, 2012.

(51) Int. Cl.
*G01B 3/16* (2006.01)
*B27C 5/10* (2006.01)
*B25H 7/02* (2006.01)

(52) U.S. Cl.
CPC .............. *G01B 3/166* (2013.01); *B25H 7/02* (2013.01); *B27C 5/10* (2013.01)

(58) Field of Classification Search
CPC ........... B23Q 9/0021; Y10T 409/30644; Y10T 409/30868; Y10T 409/308736;

(Continued)

(56) References Cited

U.S. PATENT DOCUMENTS 4,044,805 A   8/1977 Gronholz
4,291,735 A   9/1981 Silken
(Continued)

FOREIGN PATENT DOCUMENTS

EP   0469344 A1   2/1992
EP   0469538 A1   2/1992
(Continued)

OTHER PUBLICATIONS

Festool; So Schnell Gibt's Keine Bessere!; Obefräse OF 1400—setzt neue Maβstäbe in ihrer-Klasse, Werkzeuge Für höchste Ansprüche; brochure; Feb. 2004; 4 pages; TTS Systems AG & Co., Wendlingen, DE.

(Continued)

*Primary Examiner* — Matthew G Katcoff
(74) *Attorney, Agent, or Firm* — Reinhart Boerner Van Deuren P.C.

(57) ABSTRACT

A circle compass is provided. The circle compass includes a main body attachable to a router and an adjustable arm. The main body includes a central receiving aperture configured to receive a router bit or shaft therethrough. The adjustable arm is slidably attached to the main body and has a centering pin. The centering pin extends axially outward beyond a bottom side of the main body. The adjustable arm is slidable along an adjustment axis between a retracted position being associated with a smallest hole that can be formed and an extended position being associated with the largest hole that can be formed. The adjustable arm includes a clearance slot that at least partially aligns with the central receiving aperture of the main body through which the rotating portion of the router must extend to form a cut in the work piece.

7 Claims, 9 Drawing Sheets

(58) Field of Classification Search
CPC . Y10T 409/308792; Y10T 409/309016; Y10T 409/309184; Y10T 409/307896; Y10T 409/309352; Y10T 409/309408; Y10T 409/309464; B27C 5/02; B27C 5/10; B25H 1/0042; B25H 1/005
USPC .................. 144/48.6; 30/300, 310; D8/70
See application file for complete search history.

(56) References Cited

U.S. PATENT DOCUMENTS

| | | | |
|---|---|---|---|
| 4,718,468 A | | 1/1988 | Cowman |
| 4,798,506 A | * | 1/1989 | Kulp, Jr. .................. B23C 1/20 144/144.1 |
| 4,913,206 A | * | 4/1990 | Altinbasak ........... B23Q 9/0021 144/136.95 |
| 5,038,841 A | * | 8/1991 | Larmon ................. B23D 59/00 144/136.95 |
| 5,117,879 A | | 6/1992 | Payne |
| 5,289,861 A | | 3/1994 | Hedrick |
| 5,308,201 A | | 5/1994 | Wilson et al. |
| 5,398,740 A | | 3/1995 | Miller |
| 5,983,968 A | | 11/1999 | Newman |
| 6,305,447 B1 | | 10/2001 | Rousseau |
| 6,520,227 B2 | | 2/2003 | McFarlin, Jr. et al. |
| 6,622,762 B2 | * | 9/2003 | Bergner ................ B23Q 1/4809 144/136.95 |
| 7,089,978 B2 | | 8/2006 | Karkosch et al. |
| 2003/0113180 A1 | | 6/2003 | Schelberg et al. |
| 2009/0038460 A1 | * | 2/2009 | Fong .................... B23Q 9/0021 83/522.25 |

FOREIGN PATENT DOCUMENTS

| | | |
|---|---|---|
| EP | 0545142 A1 | 6/1993 |
| EP | 546376 B1 | 2/1997 |
| WO | WO 90/03248 A1 | 4/1990 |

OTHER PUBLICATIONS

Trend Routing Technology; 2002 Routing Catalogue; 2002; 5 pages.
Bosch Industrial Shop Router, Model 0601617739; Jul. 1998; 2 pages; Robert Bosch Tool Corporation.
Bosch Consumer Information; manual; May 20, 2003; 68 pages; Robert Bosch Tool Corporation.

* cited by examiner

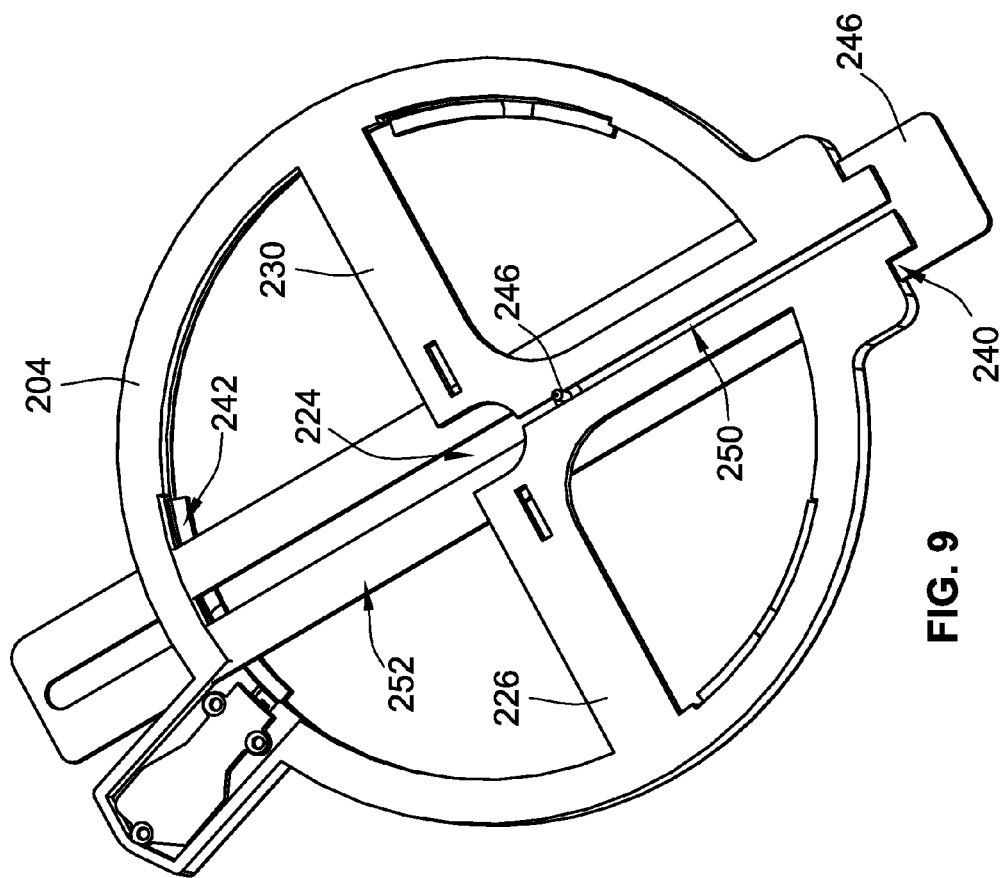

TURNLOCK SMALL CIRCLE COMPASS ATTACHMENT

CROSS-REFERENCE TO RELATED PATENT APPLICATIONS

This patent application claims the benefit of U.S. Provisional Patent Application No. 61/695,486, filed Aug. 31, 2012, the entire teachings and disclosure of which are incorporated herein by reference thereto.

FIELD OF THE INVENTION

This invention generally relates to hand tools and more particularly to attachments for routers.

BACKGROUND OF THE INVENTION

A router is a well-known rotary cutting tool for a routing a work piece. Typically, a router has a rotating bit which extends through a router base. It is often desirable to cut circular holes in a work piece or to cut circular discs (also referred to as a plug) from a work piece. A router can be used to form these holes and plugs. It is important, however, to make sure that the hole and plug is accurate. Circle compasses exist for using a router to form round plugs and holes on a very large scale. However, due to the size of the router itself, there is the need in the art for a circle compass that can be used to form small holes and small plugs.

The present invention is directed towards improvements over the prior art, and particularly for circle compass attachments for routers.

BRIEF SUMMARY OF THE INVENTION

In one embodiment of the invention, a new and improved circle compass for use with a router is provided. The circle compass includes a main body and an adjustable arm. The main body defines a top side and a bottom side. The router is positioned and/or mounted adjacent the top side. The bottom side is configured to rest on a work piece and is opposite the top side. The main body has a central receiving aperture configured to receive a rotating portion of the router therethrough for rotation about a center axis. The rotating portion is typically a router bit. The adjustable arm is attached to the main body. The adjustable arm has a centering pin. The centering pin extends axially outward beyond the bottom side of the main body. The adjustable arm is adjustable along an adjustment axis between a retracted position and an extended position. The retracted position is associated with a smallest hole that can be formed using the circle compass with the locating pin closest to the center axis. The extended position is associated with the largest hole that can be formed using the circle compass with the locating pin farthest from the center axis. The adjustable arm defines a clearance slot through which the rotating portion of the router must extend to form a cut in the work piece.

In one embodiment, the main body includes an adjustable arm receiving slot in which the adjustable arm is positioned. The adjustable arm is recessed within the adjustable arm receiving slot such that an outer surface of the adjustable arm is equal to or recessed within the receiving slot in a direction that is generally perpendicular to the adjustment axis.

In one embodiment, the adjustable arm receiving slot is formed in a top surface on the top side of the main body.

In one embodiment, the circle compass further includes a mounting adaptor including at least one thread. The main body includes a mounting plate receiving cavity including at least one thread for cooperating with the thread of the mounting adaptor. The mounting adaptor is axially insertable into the mounting plate receiving cavity and rotatable within the mounting plate receiving cavity between a locked position wherein the mounting plate is secured to the main body and an unlocked position wherein the mounting plate can be removed from the mounting plate receiving cavity.

In one embodiment, the adjustable arm has a rear portion and a front portion. The centering pin is attached to the front portion. The rear portion is always on a first side of the center axis and the front portion and centering pin are always on a second opposite side of the center axis along the adjustment axis when a rotating portion of the router extends through the clearance slot.

In one embodiment, the adjustable arm is infinitely adjustable between the extended position and the retracted position.

In one embodiment, the circle compass forms a hole having a diameter of 0.75 inches when in the retracted position and a hole having a diameter of 12 inches when in the extended position.

In one embodiment, the adjustable arm has a first scale identifying a size of the hole cut in the work piece and a second scale identifying a size of the plug that is cut from the work piece, the main body has a first indicator offset a first distance from the center axis that aligns with the first scale and a second indicator offset a second distance from the center axis that aligns with the second scale.

In one embodiment, the main body includes a pair of guide post mounts for mounting a first pair of guide posts. The guide posts are on opposite sides of the center axis and spaced outward therefrom when inserted into the guide post mounts.

In one embodiment, a method of forming a circular cut in a work piece using a router is provided. The method includes attaching a router to a main body of a circle compass; extending a rotating portion of the router through a central receiving aperture of the main body; positioning the rotating portion of the router through a clearance slot formed in an adjustable arm that is slidably attached to the main body of the circle compass; forming a central locating hole in the work piece; inserting a centering pin attached to the adjustable arm into the hole in the work piece; and rotating the router about the centering pin to form the circular cut.

In a more particular implementation, the method further includes the step of adjusting the position of the adjustable arm relative to the main body to adjust a size of the circular cut to be formed using the circle compass.

In one implementation, the step of adjusting the position of the adjustable arm occurs while the rotating portion of the router extends through the clearance slot in the adjustable arm.

In one implementation, the step of adjusting the position of the adjustable arm includes aligning a first indicator surface of the main body with a first scale on the adjustable arm indicating the outside size of the circular cut and aligning a second indicator surface of the main body with a second scale on the adjustable arm indicating the inside size of the circular cut.

In one implementation, the first and second indicator surfaces are offset radially from one another a distance equal to the radius of a portion of the router forming the circular cut.

In one implementation, the first and second indicator surfaces are co-planar and the first and second scales are radially offset from one another a distance equal to the radius of a portion of the router forming the circular cut.

In one implementation, the step of adjusting the position of the adjustable arm occurs prior to the step of positioning the rotating portion of the router through a clearance slot formed in the adjustable arm.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 7-9 illustrate a further embodiment of a circle compass for use with a router and mounting adaptor.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
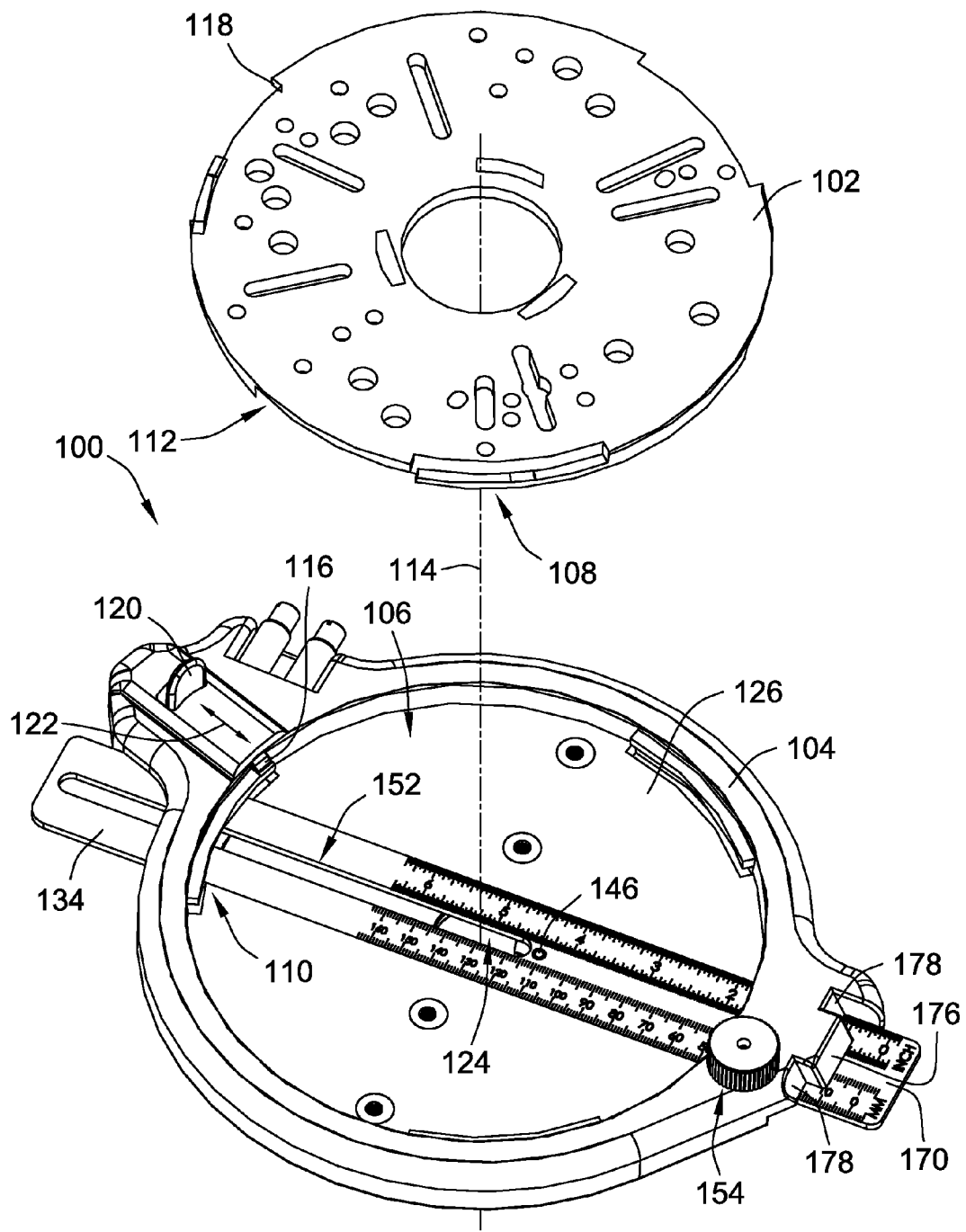
FIG. 1 is a top perspective illustration of a circle compass and a mounting adaptor for use therewith for a router.

FIG. 1 illustrates a circle compass 100 for use with a router (not shown). More particularly, the circle compass 100 is an attachment that can be attached to a router using a quick attach and detach mechanism for forming circular holes in a work piece.

FIG. 1 illustrates a mounting adapter 102 for connecting the router to the circle compass 100. The mounting adapter 102 is attached to the base of the router. A connection and mounting adapter can be configured as illustrated in U.S. Pat. No. 7,089,978 to Karkosch et al., entitled "Tool Attachment System and Router Attachment and Method Incorporating Same." The teachings and disclosures of which are incorporated herein by reference thereto in their entireties. The circle compass 100 is used for cutting circles in a work piece such as a wood board or other structure using a router.

The circle compass 100 is adjustable to vary the diameter of the cut by the router. In a preferred embodiment, the circle compass 100 is a small circle compass that can be used for forming circles within a work piece of between 0.75 inch to 15 inches in diameter. More preferably, the circle compass 100 will form circles in a work piece of having a diameter of less than or equal to 12 inches. Preferably, the circle compass 100 is infinitely adjustable between its minimum and maximum diameters.

The circle compass 100 generally includes a main body 104 that defines a mounting plate receiving cavity 106 in which the mounting adapter 102 is axially and rotatably received to secure the router to the main body 104. The mounting plate receiving cavity 106 is formed in a top side of the main body 104. The top side is opposite a bottom side which is configured to rest on a work piece in operation.

As is more fully described in U.S. Pat. No. 7,089,978 identified above, the mounting adapter 102 includes one or more thread arrangements 108 that cooperate with corresponding thread arrangements 110 of the main body 104. In the illustrated embodiment, the threads of the mounting adaptor 102 extend generally radially outward while the threads of the main body 104 extend radially inward. The engagement between the thread arrangements 108, 110 axially secures mounting adapter 102 within the mounting plate receiving cavity 106.

To secure the mounting adaptor 102 in the main body 104, and consequently the router to the circle compass 100, a user will axially insert the mounting adapter 102 axially into the mounting plate receiving cavity 106 with the mounting thread arrangements 110 of the main body aligned with recessed portions 112 of the thread arrangements 108 of the mounting adapter 102. The user will then rotate the mounting adapter 102 (and the attached tool such as the attached router) angularly about the insertion axis 114 to cause the thread arrangements 108, 110 to engage. This axis 114 is generally the same axis about which the router bit will rotate. Further, this axis may also be referred to as a center axis.

The circle compass 100 includes a releasable catch 116 that selectively cooperates with the mounting adapter 102 to inhibit or allow rotation of the mounting adapter 102 relative to the main body 104. More particularly, the releasable catch 116 will engage an abutment 118 of the mounting adapter to prevent angular rotation of the mounting adapter 102. The releasable catch 116 can be actuated using lever 120 to cause disengagement between the releasable catch 116 and abutment 118 for removal of the mounting adaptor 102 from the main body 104. This motion is illustrated by arrow 122. The lever 120 and releasable catch 116 may be spring loaded and the releasable catch 116 may include a slanted top camming surface that engages or cooperates with the mounting adapter 102 such that when the mounting adapter is axially inserted into the mounting plate receiving cavity 106 the releasable catch 116 is automatically translated radially outward relative to insertion axis 114. Then, once the mounting adapter 102 is rotated to a locked position such that the abutment 118 has been rotated angularly past the releasable catch 116, the releasable catch 116 will automatically or spring radially inward such that the releasable catch 116 will inhibit angular motion of the mounting adapter 102 in the opposite (counter-clockwise in the illustrated FIG. 1) direction securing the mounting adapter 102 to the circle compass 100.

Figure 2:
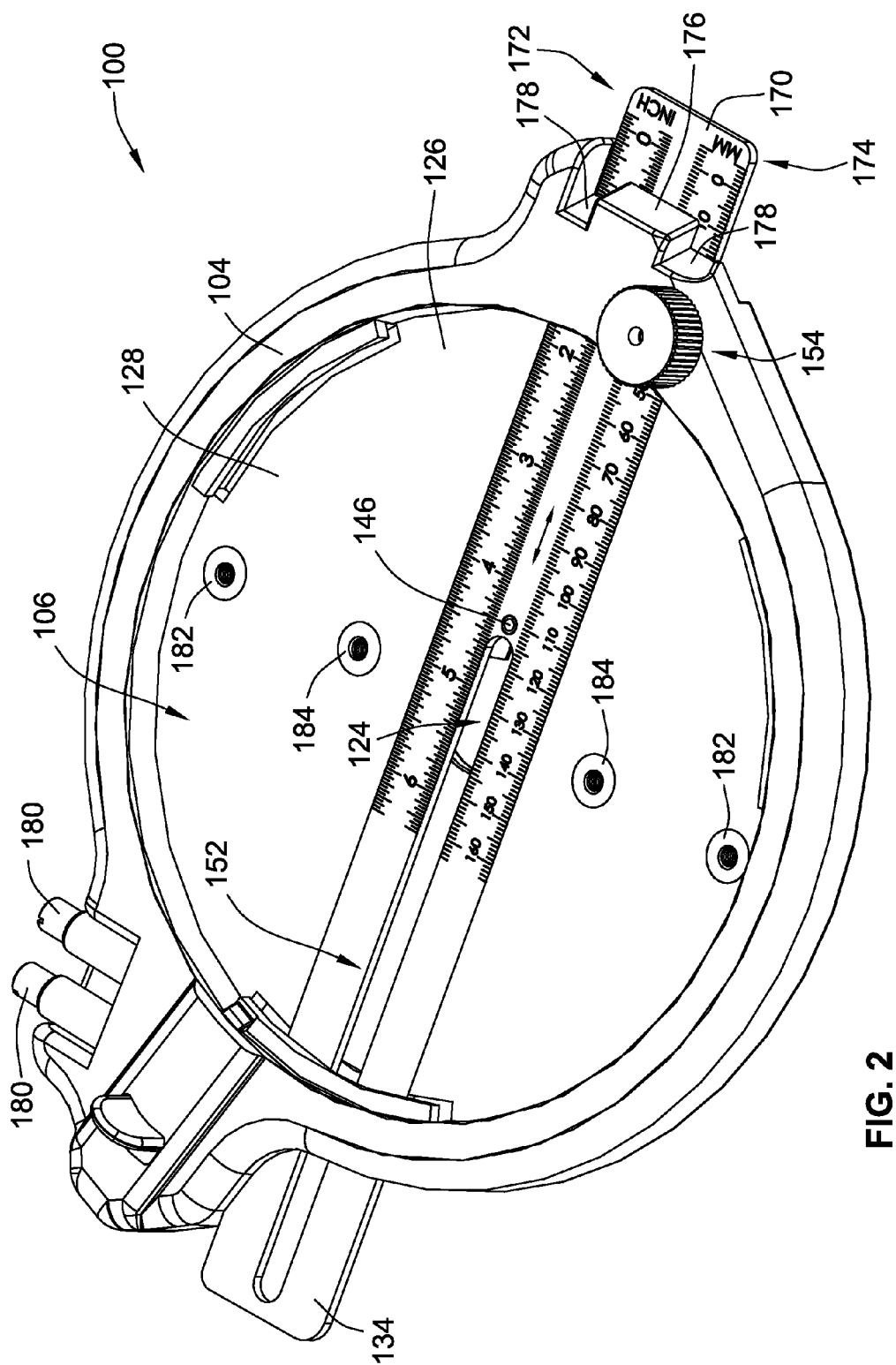
FIG. 2 is top perspective illustration of the circle compass of FIG. 1.
Figure 3:
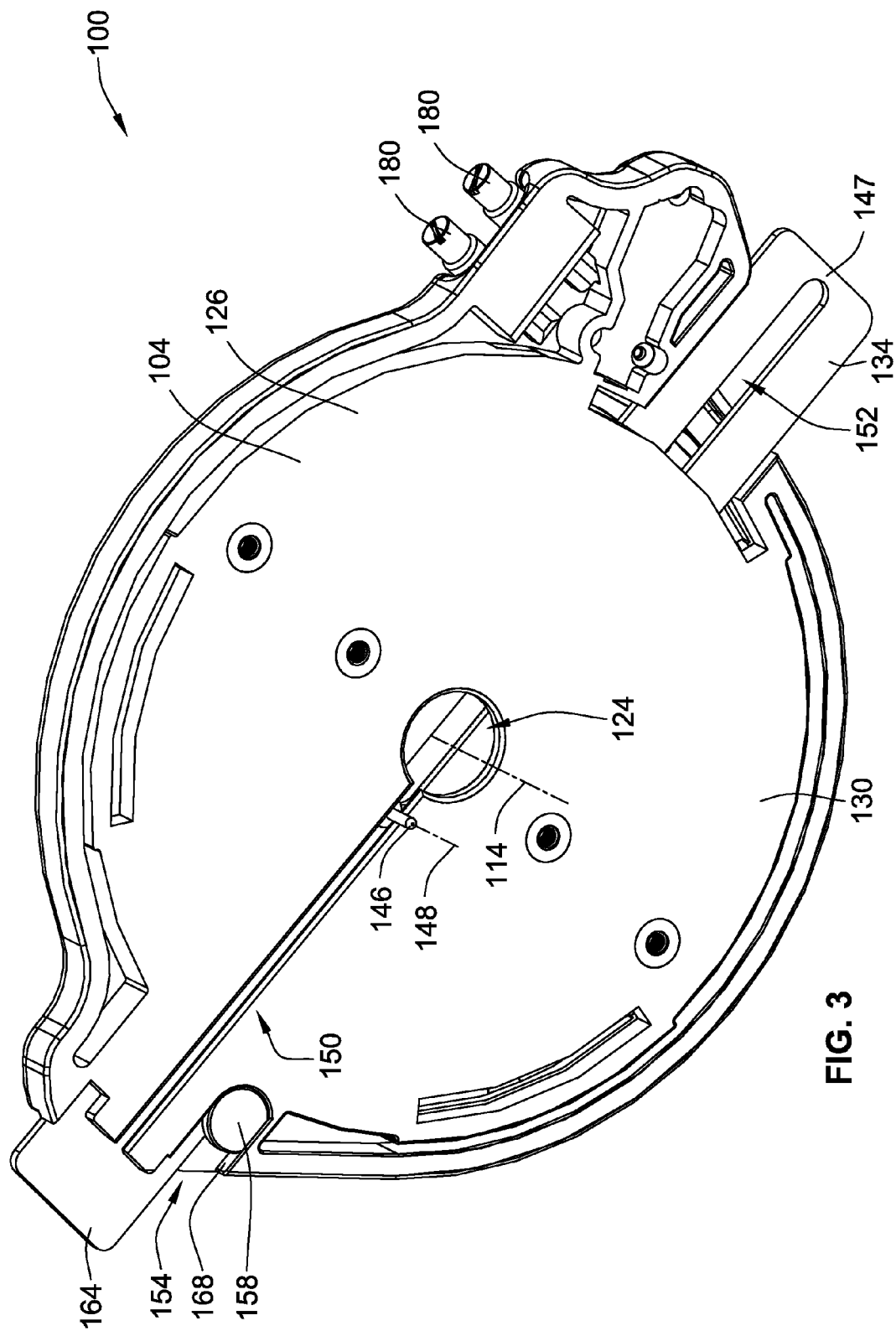
FIG. 3 is a bottom perspective illustration of the circle compass of FIG. 2.

With reference to FIGS. 2 and 3, the circle compass 100 includes a central receiving aperture 124 that is generally coaxial with the insertion axis 114 (see FIG. 1). The central receiving aperture 124 is sized to receive a rotating portion of the router, typically the router bit (not shown), therethrough. The central receiving aperture 124 is formed in a bottom plate portion 126 of the main body 104. The bottom plate portion 126 includes a top surface 128 (see FIG. 2) and a bottom surface 130 (see FIG. 3). The central receiving aperture 124 extends between the top and bottom surfaces 128, 130. The router will be attached to the main body on the top side adjacent top surface 128.

Figure 4:
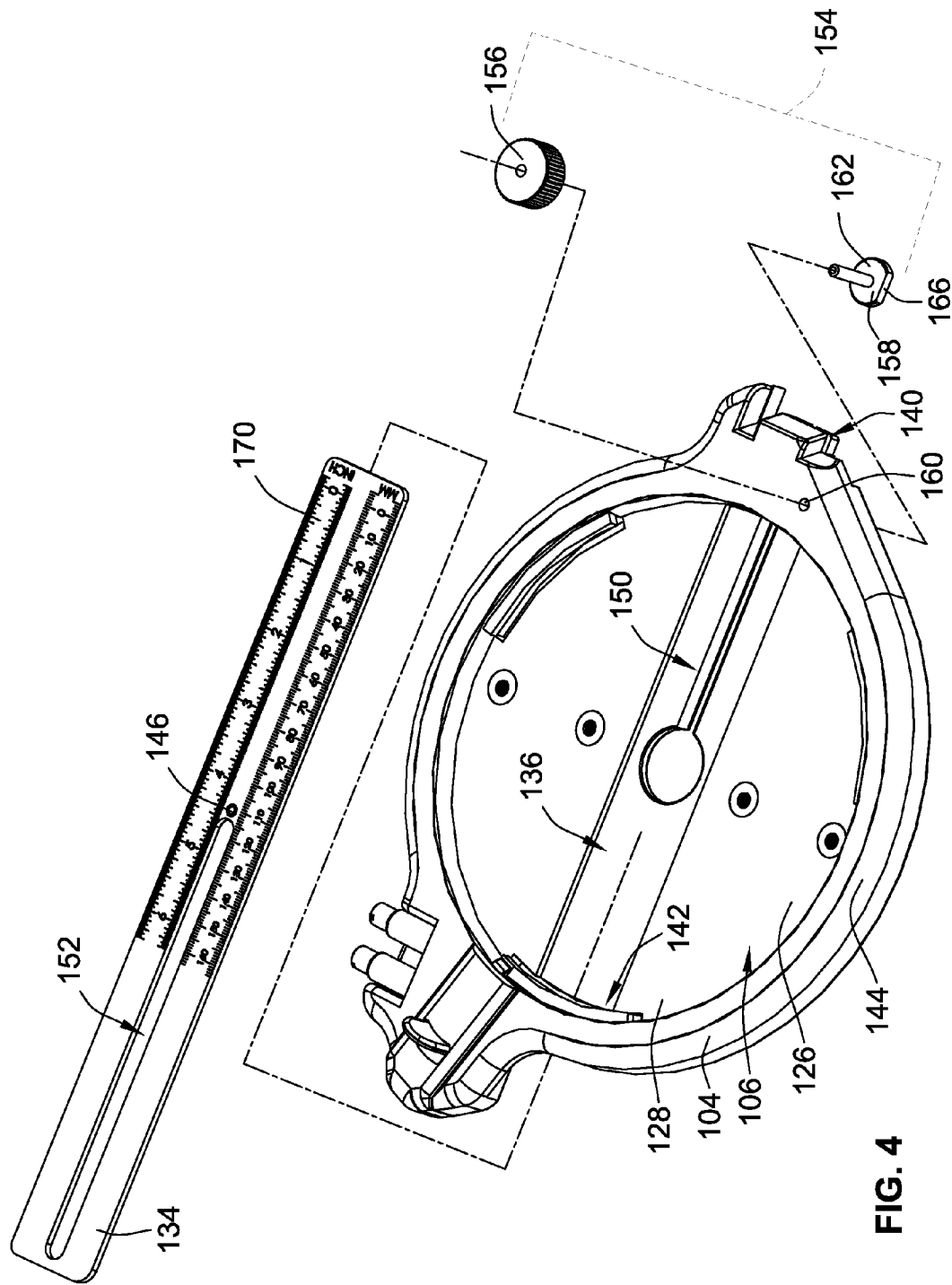
FIG. 4 is a top perspective exploded illustration of the circle compass of FIG. 1.
Figure 5:
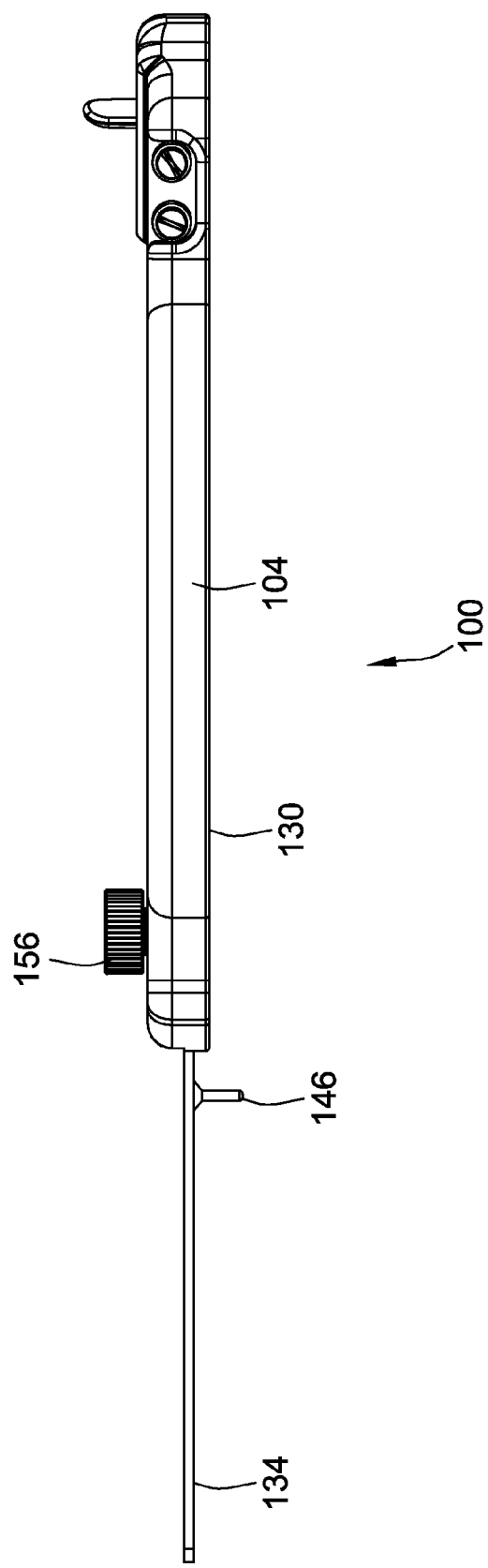
FIG. 5 is a side illustration of the circle compass of FIG. 1 with the adjustable arm in an extended position.
Figure 6:
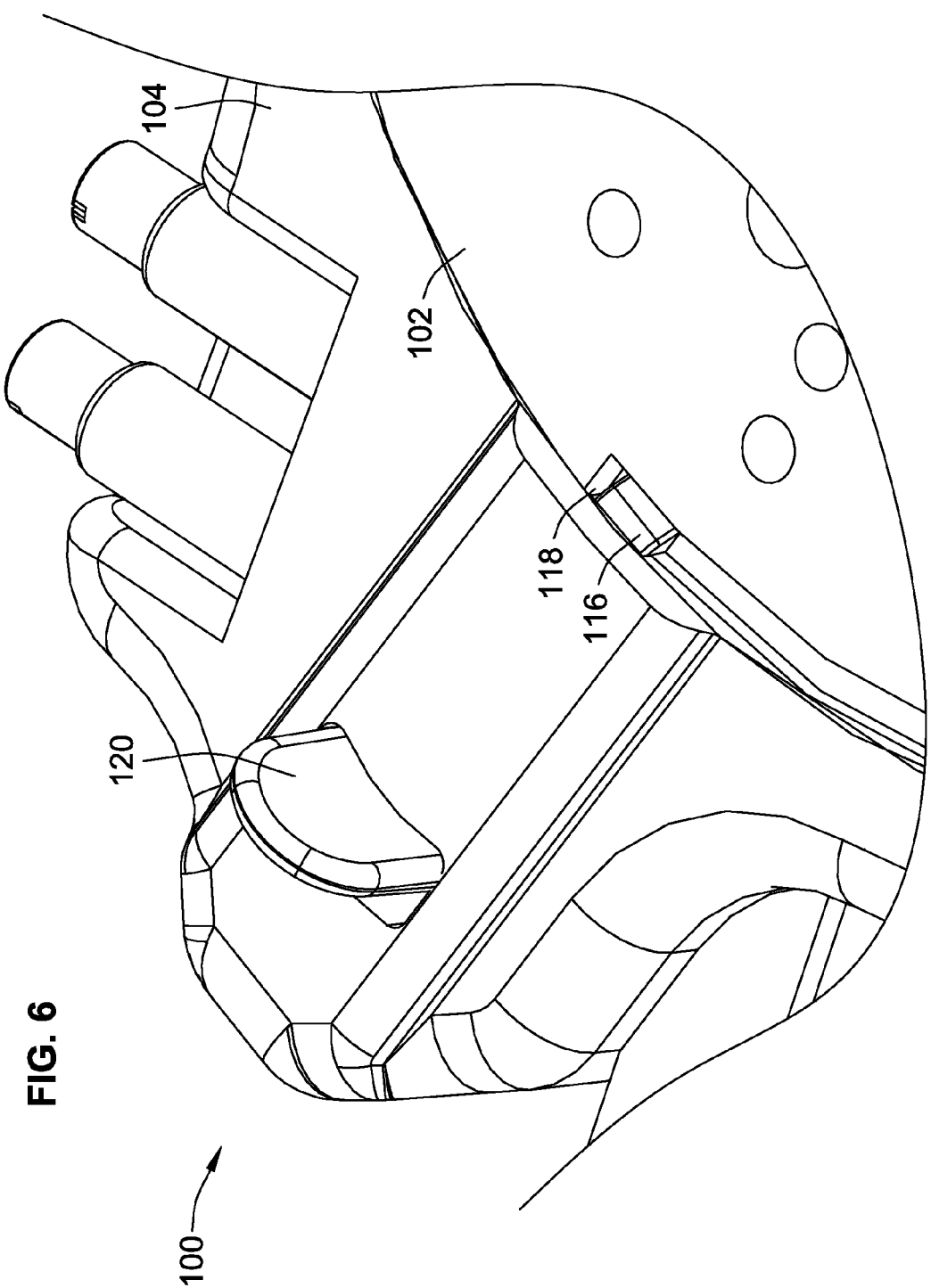
FIG. 6 is an enlarged top perspective partial illustration of the circle compass and mounting adaptor of FIG. 1.

The circle compass 100 includes an adjustable arm 134 that is positionally adjustable relative to the main body 104 and that adjusts the diameter of the circle that is formed by the router using the circle compass 100. The adjustable arm 134 is slidably received in an adjustable arm receiving slot 136 formed in the top surface 128 of the bottom plate portion 126 of the main body 104 (see FIG. 4). The adjustable arm 134 is axially slideable within the adjustable arm receiving slot 136 along the axis defined by the adjustable arm receiving slot 136 between an extended position and a retracted position, represented by arrow 138 (see FIG. 2). The greater the amount that the adjustable arm 134 extends or is extended outward from the main body 104, the greater the diameter of the circle that will be formed using the circle compass. More particularly, the maximum extended position corresponds to the maximum size hole that can be formed and the minimum retracted position corresponds to the minimum size hole that can be formed using the circle compass 100.

The main body 104 includes a pair of slots 140, 142 formed through a collar portion 144 of the main body 104 through which the adjustable arm 134 can extend. Thus, these slots 140, 142 are in communication with adjustable arm receiving slot 136 that receives the adjustable arm 134. These slots 140, 142 allow for adjustment of the position of the adjustable arm 134 relative to the main body 104.

The adjustable arm 134 includes a centering pin 146. The centering pin is used for locating the circle compass 100 relative to the work piece. More particularly, the centering pin 146 will be inserted into a hole in the work piece. This hole will be the center of the circle that is to be cut out of the work piece using the router. In operation, the user will first drill a hole sized for the centering pin 146 at the center of the location where the desired hole is to be cut from the work piece. The user will then insert the centering pin 146 into the hole to cut the circle in the work piece using the router. The user will rotate the router and the circle compass 100 about the axis 148 (see FIG. 3) defined by the centering pin 146. Axis 148 is parallel to but laterally offset from center axis 114 along the axis that the adjustable arm 134 moves relative to main body 104.

The bottom plate portion 126 of the main body 104 includes a centering pin receiving slot 150 that extends therethrough from the top surface 128 to the bottom surface 130. The centering pin 146 slides axially within the centering pin receiving slot 150 as the size of the desired hole to be cut is adjusted. The position of the centering pin 146 is adjusted by sliding the adjustable arm 134 within adjustable arm receiving slot 136 in the top surface of the bottom plate portion 126. The farther the centering pin 146 is translated away from the insertion axis 114 or center axis of the circle compass 100, the greater the size of the hole what will be cut using the circle compass 100 and attached router. The adjustable arm 134 and centering pin 146 may be formed as separate pieces that are attached together or a single piece.

The adjustable arm 134 includes a clearance slot 152 through which the shaft of the router bit can extend. This allows for the adjustable arm to be longer and to improve the stability of adjustable arm 134 within the adjustable arm receiving slot 136 of the main body 104. More particularly, it allows for the adjustable arm 134 to be long such that the adjustable arm 134 can have a portion on both sides of the insertion axis 114 (i.e. the axis about which the router bit will rotate). Otherwise, if the adjustable arm 134 were shorter and a large whole was desired, a limited amount of the adjustable arm 134 may be received in the adjustable arm receiving slot 136 formed in the top surface 128 of the bottom plate portion 126 such that instability may be present allowing for inaccurate holes to be cut by the router. The centering pin 146 is attached to a front portion of the adjustable arm 134. A rear portion 147 of the adjustable arm remains on an opposite side of the center axis 114 when a router bit extends through the clearance slot 152.

The clearance slot 152 is aligned with the centering pin 146 in the center of the adjustable arm receiving slot 136 formed in the top surface of the bottom plate portion 126. This promotes accurate adjustment of the circle compass 110 when the adjustable arm 134 is adjusted within the slots 136. More particularly, a line passing through the center axis 114 and the center pin axis 148 is parallel to the axis along which the adjustable arm 134 slides within adjustable arm receiving slot 136.

The circle compass 100 includes a lock arrangement 154 that clamps the adjustable arm 134 relative to the main body 104 to prevent adjustment of the position of the adjustable arm 134 relative to the main body 104. When the adjustable arm 134 is in a fixed location relative to the main body 104, the diameter of the circle that is to be cut using the circle compass 100 is maintained. In the illustrated embodiment, the lock arrangement 154 includes a releasable clamping pad 158 that is threadably secured to a knob 156 through aperture 160. The clamp pad 158 includes a clamping surface 162 that is selectively clamped against a bottom surface 164 of the adjustable arm 134 to prevent axial motion of the adjustable arm 134 within the adjustable arm receiving slot 136 of the bottom plate portion 126. As the knob 156 of the lock arrangement 154 is tightened relative to the clam pad 158, the clamp pad is tightened against bottom surface 164 of the adjustable arm 134 and the adjustable arm 134 is clamped between the main body 104 and the clamp pad 158. The clamp pad 158 has a flat 166 on one side that cooperates with a corresponding flat wall 168 of the main body 104 to prevent rotation of the clamp pad 158 in order to allow for tightening of knob 156 in the clamp pad 158 relative to the adjustable arm 134. Alternative lock arrangements are contemplated. For instance, a plurality of detents and a spring loaded pin could be used. However, this may limit the infinite adjustability of the design.

The top surface 170 of the adjustable arm includes scales 172, 174 to indicate to the user the diameter of the hole that will be cut into the work piece using the circle compass 100. More particularly, the main body 104 includes a first indicator surface 176 that identifies the radius of the plug that will be cut from the work piece. For instance, in FIG. 2, the indicator surface 176 is generally aligned with the 10 millimeter mark indicating that the radius of the plug would be 10 millimeters.

The main body 104 includes second indicator surfaces 178 that indicate the radius of the hole that will be cut in the work piece based on the use of a known diameter router bit. This second measurement compensates for the diameter of the router bit forming the cut in the work piece. As such, the inclusion of the two separate indicator surfaces 176, 178 allows for the user to quickly and easily determine both the size of the whole in the work piece plus the resultant size of the plug removed from the work piece. While the first and second indicator surfaces 176, 178 are illustrated as being offset, alternative embodiments could have the indicator surfaces be co-planar and have the scales offset.

The circle compass 100 can also be used for cutting straight mortise slots in thinner boards. More particularly, the circle compass 100 includes a pair of guide posts 180 that are selectively mountable in a first set of guide post mounting apertures 182 and a second set of guide post mounting apertures 184. These guide posts 180 would be inserted into the bottom of the main body 104 such that they extend axially outward from a bottom surface 130 of the bottom plate portion 126. Further, the guide posts 180 are positioned on opposite sides of the center axis 114 and spaced outward therefrom.

The user can then auto-center the router on a thin piece of board such that a mortise slot or groove can be cut in the center of the board. More particularly, the user will insert the board in between the two guide posts 180 and rotate the router and circle compass 100 until one guide post abuts against one side of the board and the other guide post abuts the other side of the board. This will automatically center the router between the two sides of the board. Two different sets of guide post mounting apertures 182, 184 allow for different width wood to be easily mortised.

Figure 7:
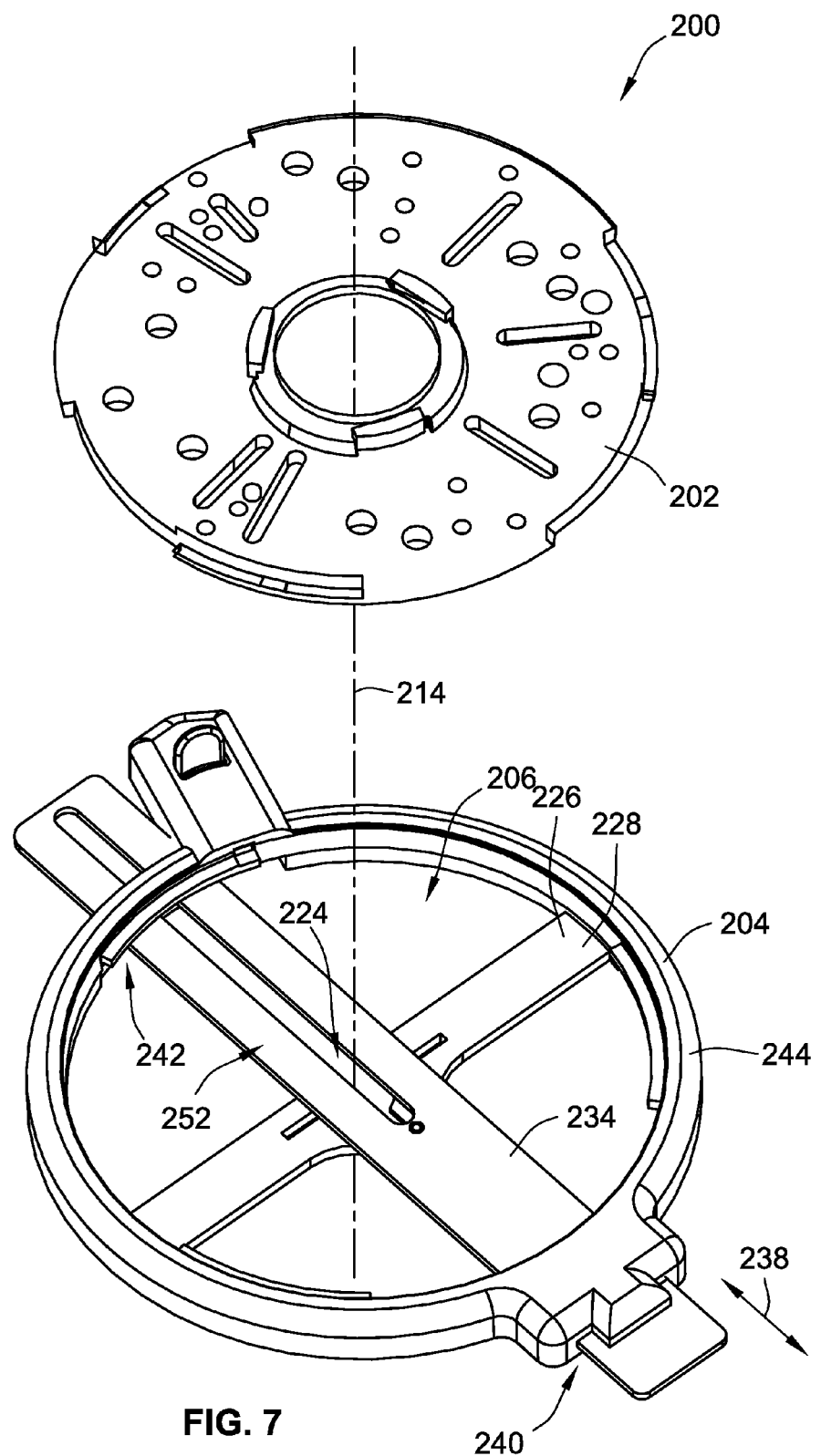
Figure 8:
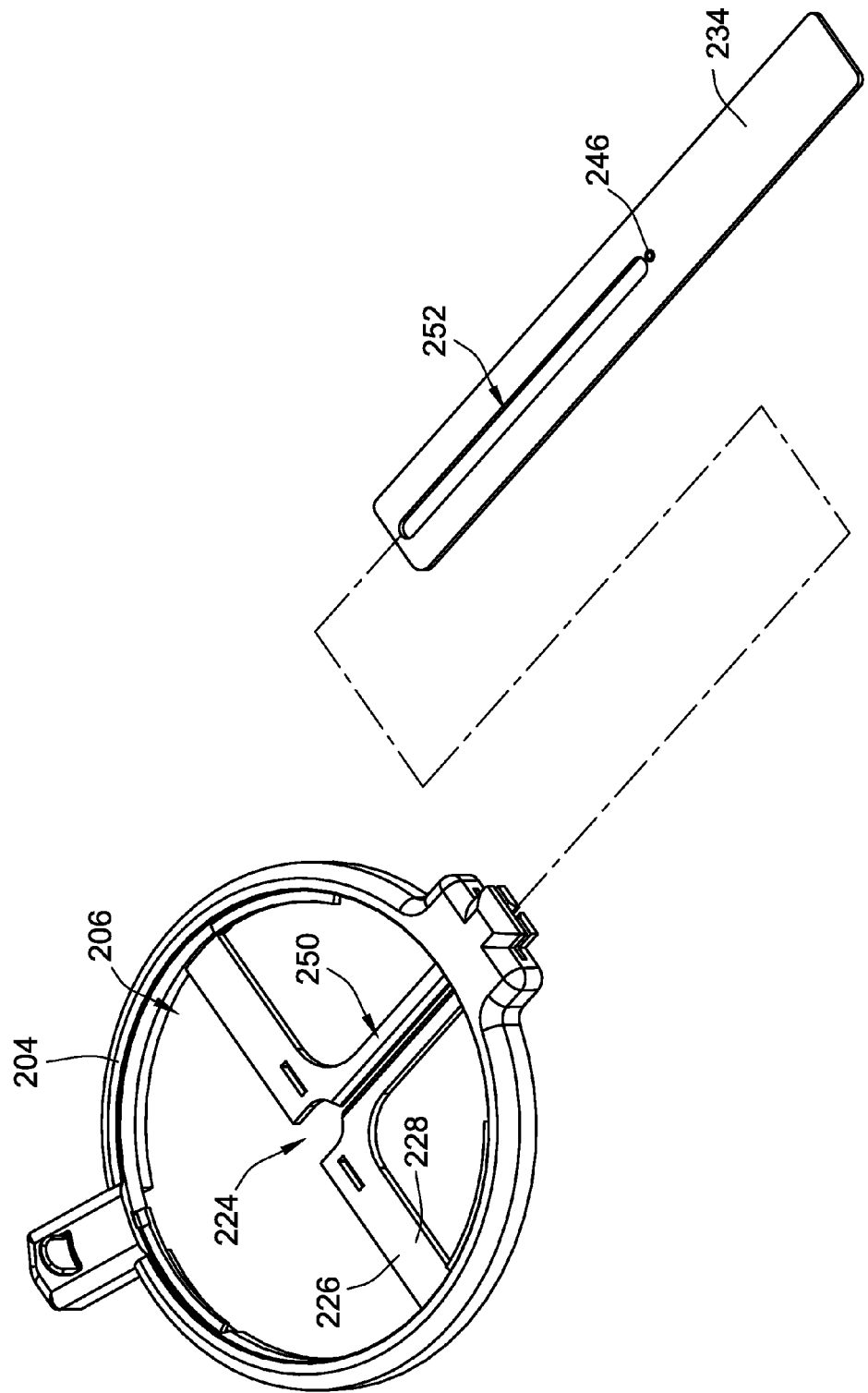

FIGS. 7-9 illustrate a further embodiment of a circle compass 200. The circle compass 200 is similar to circle compass 100 and generally includes a main body 204 that defines a mounting plate receiving cavity 206 in which the mounting adapter 202 is axially and rotatably received to secure the router to the main body 204. The mounting plate receiving cavity 206 is formed in a top side of the main body 204. The top side is opposite a bottom side which is configured to rest on a work piece in operation.

The circle compass 200 includes a central receiving aperture 226 that is generally coaxial with the insertion axis. The central receiving aperture 226 is sized to receive a rotating portion of the router, typically the router bit (not shown), therethrough. The central receiving aperture 226 is formed in a bottom plate portion 226 of the main body 204. The bottom plate portion 226 includes a top surface 228 and a bottom surface 230 (see FIG. 9). The central receiving aperture 224 extends between the top and bottom surfaces 228, 230. The router will be attached to the main body on the top side adjacent top surface 228.

The circle compass 200 includes an adjustable arm 234 that is postionally adjustable relative to the main body 204 and that adjusts the diameter of the circle that is formed by the router using the circle compass 200. The adjustable arm 234 is axially slideable between an extended position and a retracted position, represented by arrow 238 (see FIG. 7). The greater the amount that the adjustable arm 234 extends or is extended outward from the main body 204, the greater the diameter of the circle that will be formed using the circle compass.

The main body 104 includes a pair of slots 240, 242 formed through a collar portion 244 of the main body 204 through which the adjustable arm 234 can extend. These slots 240, 242 allow for adjustment of the position of the adjustable arm 234 relative to the main body 204.

The adjustable arm 234 includes a centering pin 246. The centering pin 246 is used for locating the circle compass 200 relative to the work piece as described above.

The bottom plate portion 226 of the main body 204 includes a centering pin receiving slot 250 (see FIGS. 7 and 8) that extends therethrough from the top surface 228 to the bottom surface 230. The centering pin 246 slides axially within the centering pin receiving slot 250 as the size of the desired hole to be cut is adjusted.

The adjustable arm 234 includes a clearance slot 252 through which the shaft of the router bit can extend. This allows for the adjustable arm to be longer and to improve the stability of adjustable arm 234 within the main body 204.

A locking arrangement similar to that described above may be used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A circle compass for use with a router comprising:
   a main body defining a top side and a bottom side, the main body being configured to attach a router adjacent the top side and the bottom side being configured to rest on a work piece and opposite the top side, the main body having a central receiving aperture configured to receive a rotating portion of the router therethrough for rotation about a center axis;
   an adjustable arm attached to the main body, the adjustable arm having a centering pin, the centering pin extending axially outward beyond the bottom side of the main body, the adjustable arm adjustable along an adjustment axis between a retracted position and an extended position, the retracted position being associated with a smallest hole that can be formed using the circle compass with the centering pin closest to the center axis and the extended position being associated with the largest hole that can be formed using the circle compass with the centering pin farthest from the center axis; and
   wherein the adjustable arm has a first scale identifying a size of the hole cut in the work piece and a second scale identifying a size of the plug that is cut from the work piece, the main body has a first indicator offset a first distance from the center axis that aligns with the first scale and a second indicator offset a second distance from the center axis that aligns with the second scale.

2. The circle compass of claim 1, wherein the main body includes an adjustable arm receiving slot in which the adjustable arm is positioned, the adjustable arm being recessed within the adjustable arm receiving slot such that an outer surface of the adjustable arm is equal to or recessed within the receiving slot in a direction that is generally perpendicular to the adjustment axis.

3. A circle compass for use with a router comprising:
a main body defining a top side and a bottom side, the main body being configured to attach a router adjacent the top side and the bottom side being configured to rest on a work piece and opposite the top side, the main body having a central receiving aperture configured to receive a rotating portion of the router therethrough for rotation about a center axis;
an adjustable arm attached to the main body, the adjustable arm having a centering pin, the centering pin extending axially outward beyond the bottom side of the main body, the adjustable arm adjustable along an adjustment axis between a retracted position and an extended position, the retracted position being associated with a smallest hole that can be formed using the circle compass with the centering pin closest to the center axis and the extended Position being associated with the largest hole that can be formed using the circle compass with the centering pin farthest from the center axis, the adjustable arm defining a clearance slot through which the rotating portion of the router must extend to form a cut in the work piece;
wherein the main body includes an adjustable arm receiving slot in which the adjustable arm is positioned, the adjustable arm being recessed within the adjustable arm receiving slot such that an outer surface of the adjustable arm is equal to or recessed within the receiving slot in a direction that is generally perpendicular to the adjustment axis; and
wherein the adjustable arm receiving slot is formed in a top surface on the top side of the main body.

4. The circle compass of claim 1, further comprising a mounting adaptor attachable to a router for securing the router to the main body, the mounting adaptor including at least one thread and wherein the main body includes a mounting plate receiving cavity including at least one thread for cooperating with the thread of the mounting adaptor, the mounting adaptor being axially insertable into the mounting plate receiving cavity and rotatable within the mounting plate receiving cavity between a locked position wherein the mounting plate is secured to the main body and an unlocked position wherein the mounting plate can be removed from the mounting plate receiving cavity.

5. A circle compass for use with a router comprising:
a main body defining a top side and a bottom side, the main body being configured to attach a router adjacent the top side and the bottom side being configured to rest on a work piece and opposite the top side, the main body having a central receiving aperture configured to receive a rotating portion of the router therethrough for rotation about a center axis;
an adjustable arm attached to the main body, the adjustable arm having a centering pin, the centering pin extending axially outward beyond the bottom side of the main body, the adjustable arm adjustable along an adjustment axis between a retracted position and an extended position, the retracted position being associated with a smallest hole that can be formed using the circle compass with the centering pin closest to the center axis and the extended Position being associated with the largest hole that can be formed using the circle compass with the centering pin farthest from the center axis, the adjustable arm defining a clearance slot through which the rotating portion of the router must extend to form a cut in the work piece; and
wherein the adjustable arm has a rear portion and a front portion, the centering pin being attached to the front portion, the rear portion always being on a first side of the center axis and the front portion and centering pin always being on a second opposite side of the center axis along the adjustment axis when a rotating portion of the router extends through the clearance slot.

6. The circle compass of claim 1, wherein the circle compass forms a hole having a diameter of 0.75 inches when in the retracted position and a hole having a diameter of 12 inches when in the extended position.

7. The circle compass of claim 1, further comprising a first pair of guide posts;
wherein the main body includes a pair of guide post mounts for mounting the first pair of guide posts, the guide post mounts being on opposite sides of the center axis and spaced outward therefrom.

* * * * *